United States Patent [19]

Kavolelis et al.

[11] 4,118,953
[45] Oct. 10, 1978

[54] CENTRIFUGAL ELASTIC COUPLING

[75] Inventors: Antanas-Pyatras Kazimero Kavolelis; Bronislavas Prano Spruogis; Oleg Borisovich Turenko; Vladimir Vladimirovich Krupich; Valerienas Antano Sakalauskas; Arunas Romualdo Yakshtas, all of Vilnjus, U.S.S.R.

[73] Assignee: Vilnjussky Inzhenerno-Stroitelny Institut, Vilnjus, U.S.S.R.

[21] Appl. No.: 755,255

[22] Filed: Dec. 29, 1976

[51] Int. Cl.² .......................... F16D 3/58; F16D 3/14
[52] U.S. Cl. ..................................... 64/12; 64/27 R; 64/27 B; 64/24; 64/15 B
[58] Field of Search ............ 64/12, 15 B, 27 B, 27 R, 64/24

[56] References Cited

U.S. PATENT DOCUMENTS

| 1,659,353 | 2/1928 | Dwyer | 64/12 |
| 1,673,959 | 6/1928 | Wallgren | 64/27 B |
| 1,734,988 | 11/1929 | Wilson | 64/12 |
| 2,116,192 | 5/1938 | Draminsky | 64/24 |
| 2,858,855 | 11/1958 | Picanol | 64/12 |

FOREIGN PATENT DOCUMENTS

| 89,078 | 12/1960 | Denmark | 64/12 |
| 1,180,254 | 12/1958 | France | 64/12 |
| 324,296 | 4/1919 | Fed. Rep. of Germany | 64/12 |

Primary Examiner—Benjamin W. Wyche
Assistant Examiner—R. C. Turner
Attorney, Agent, or Firm—Fleit & Jacobson

[57] ABSTRACT

The coupling according to the invention comprises two members with supporting elements and is provided with an elastic ring interacting with the supporting elements. According to the invention, one member is made in the form of a hub with arms and the other member comprises a hub with a rim embracing the elastic ring and the former member with arms. The supporting elements, according to the invention, are secured to the arms and to the inner surface of the ring within the limits of its depth. The coupling of the invention is intended to stabilize rotation when transmitting high speeds and torques as well as to compensate for misalignments of shafts.

7 Claims, 4 Drawing Figures

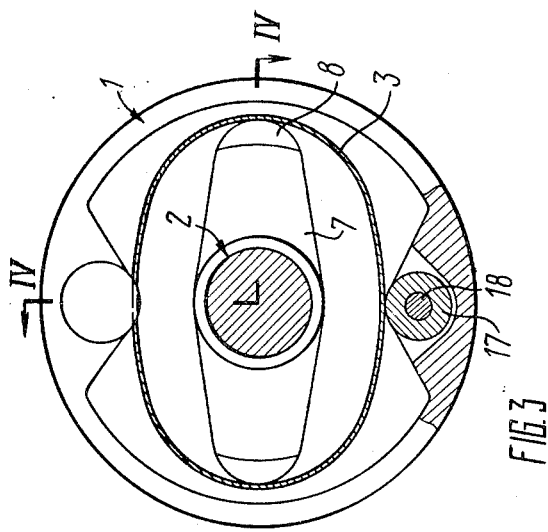
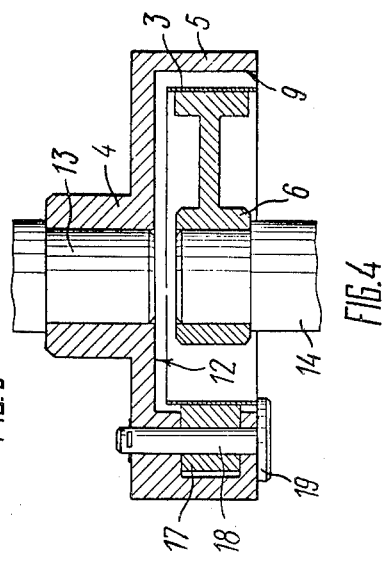
FIG.3    FIG.4
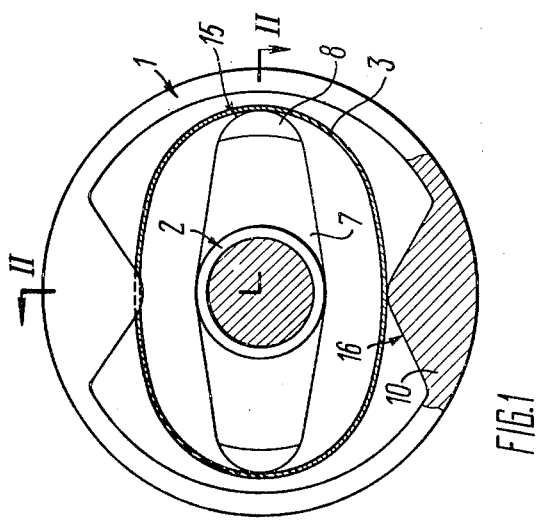
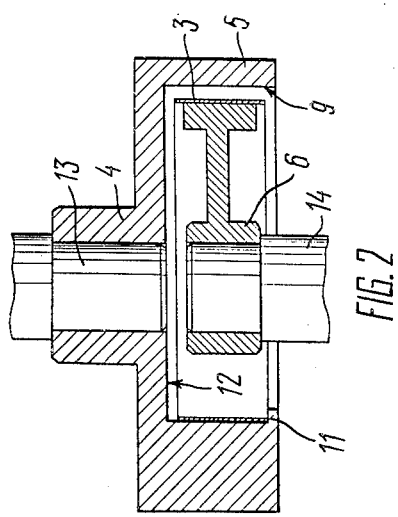
FIG.1    FIG.2

CENTRIFUGAL ELASTIC COUPLING

This invention relates to the field mechanical engineering and, more particularly, to centrifugal elastic coupling used to stabilize rotational motions.

The invention may be used most advantageously in torque transmitting mechanisms imposed upon with stringent requirements as to speed and power characteristics, featuring higher rotational speeds, torque transmitted and amount of shaft misalignment.

Moreover, the present invention may find utility in mechanisms with strict requirements on the uniformity of rotation.

Known in the art are centrifugal elastic coupling having both metal or non-metal members. The use of couplings with elastic members of rubber for heavy-loaded high-speed mechanisms is limited in view of lower specific power consumption and heat-transfer capacity of rubber, its inadequate resistance to wear and inability to work in conditions of corrosive media and high temperatures.

Elastic couplings with sets of sleeve-like and coil or helical springs (such as "Dehly-Demag", "Cardelis", etc.) are employed in heavy-loaded mechanisms operating at relatively low speeds of rotation (not more than 8000 rpm). However, the use of couplings of the kind referred to above should meet more stringent requirements upon permissible misalignment of shafts (i.e. radial misalignment up to 0.2 mm and angular misalignment up to 1°). These couplings are difficult for manufacture and repair, as they consists of a great number of component parts having intricate configuration and close tolerances for dimensions. Besides, these couplings are heavy and feature large overall dimensions. The working speed range is limited for these couplings in the high-frequency area (not more than 8000–10000 rpm). Assembly and disassembly of the couplings present certain difficulties. As the helical springs in couplings of the "Dehly-Demag" type work in shear they need plenty lubrication; however, penetration of lubricant inbetween the spring turns is hampered.

"Cardelis"-type couplings necessitate the use of a guard cover to ensure safety in operation.

Also known in the art is a centrifugal elastic coupling comprising two members in the form of hubs having two oppositely directed arms making in combination a spider and provided with supporting elements in the form of cylindrical pins cantilevered on the side surfaces of the arms. Both members are interconnected by means of an elastic ring which is extended during assembling and works in the extended state, the ring bearing against the pins of the arms. However, the cantilever arrangement of the pins results in the increased overall dimensions of the coupling and in considerable bending moments arising during the operation which limits the working speed range. Furthermore, the known coupling is characterized by low strength and poor lubrication of working surfaces and it can not be used without an additional guard cover.

It is the main object of the present invention to provide a centrifugal elastic coupling featuring complete safety in operation. It is an important object of the invention to provide a coupling of the kind referred to above that makes it possible to attain higher rotational speeds than conventional couplings of this type.

Another no less important object of the invention is to provide the coupling capable of imparting higher torques than the couplings known in the previous art. Still another object of the present invention is to provide a centrifugal elastic coupling permitting a greater amount of misalignment between interconnected shafts than the conventional couplings.

These and other objects are achieved in a centrifugal elastic coupling comprising two members provided with supporting elements interacting with an elastic ring, wherein, according to the invention, one member comprises a hub with a rim embracing the elastic ring and the other member comprising a hub having arms, the supporting elements being secured to the arms and to the inner surface of the rim within the limits of its depth.

Due to the fact that the supporting elements of the coupling are secured to the arms and to the inner surface of the rim within the limits of the depth of the latter, it is possible to increase the width of the elastic ring without increasing the diameter thereof and, hence, its overall dimensions, thereby ensuring the transmission of high torques, and providing for an increase in the permissible working rotational speeds with a greater amount of misalignment between the interconnected shafts. As one of the coupling members is made in the form of a hub having a rim embracing the elastic ring and the other coupling member, it is possible to use the rim at the same time as a guard cover enclosing the elastic ring, supporting elements and the other coupling member, whereby the safety of the operation is ensured.

In order to decrease stresses arising in the elastic ring at the points of engagement thereof with the supporting elements, it is recommended to form the latter with a cylindrical surface whereof the convex side faces the elastic ring.

To reduce friction between the elastic ring and the supporting elements, it is expedient to make the latter in the form of bearings whereof the outer surface faces the elastic ring.

In order to damp torsional oscillations of low amplitude, it is advantageous to use as supporting elements for the rim the bearings whereof the outer surface faces the elastic ring.

The friction at the points of contact between the elastic ring and the supporting elements admits slight bending deformations of the elastic ring, which adds to the damping capacity of the coupling.

Given hereinbelow is a description of embodiments of the present invention, with reference being had to the accompanying drawings, wherein:

FIG. 1 is a longitudinal sectional view of a centrifugal elastic coupling with supporting elements having cylindrical surface;

FIG. 2 is a sectional view along lines II—II in FIG. 1;

FIG. 3 is another embodiment of a centrifugal elastic coupling with a sliding bearing mounted in the rim;

FIG. 4 is a sectional view along lines IV—IV in FIG. 3.

A centrifugal elastic coupling according to the invention comprises two members 1 (FIGS. 1 and 2) and 2 each having supporting elements, and an elastic ring 3 interacting with the supporting elements.

According to the invention, the member 1 is essentially a hub 4 (FIG. 2) with a rim 5 embracing the elastic ring 3 and the other member 2. The latter is made in the form of a hub 6 having two arms 7 (FIG. 1). Supporting elements 8 are mounted on the ends of the arms 7, Respective supporting elements 10 (FIG. 1) are secured to the inner surface 9 (FIG. 2) of the rim 5 within the limits of its depth. The elastic ring 3 is held against axial displacement by means of shoulders 11 (FIG. 2) provided on the outer sides of the supporting elements 10 and by the surface 12 of the bottom of the rim 5.

The hubs 4 and 6 of members 1 and 2 respectively are rigidly fixed on shafts 13 and 14 respectively.

To reduce stresses arising in the elastic ring 3 in the points of its contact with the supporting elements 8 and 10, the latter are provided with cylindrical surfaces 15 and 16 respectively, the convex sides of these surfaces facing the elastic ring 3.

Another embodiment of a coupling according to the invention is shown in FIGS. 3 and 4, wherein bearings are used as supporting elements for the rim 5, the outer surfaces of the bearings facing the elastic ring 3. Each bearing comprises a sleeve 17 rotated freely on an axle 18 journalled in the end wall of the rim 5. In this case, the axial displacement of the elastic ring 3 is limited by the surface 12 of the bottom of the rim 5 and by the shoulders 19 provided on the axles 18.

Owing to the fact that the supporting elements of the rim 5 are made in the form of the bearings, it is possible to increase the damping effect on torsional oscillations of low amplitude.

A particular embodiment is possible, wherein used as supporting elements for both the rim 5 and the arms 7 are bearings whose outer surfaces faces the elastic ring 3, whereby the friction between the elastic ring 3 and the supporting elements is reduced.

The coupling of the invention operates in the following manner.

With torque applied to the shafts 13 and 14, the arms 7 begin to rotate with respect to the supporting elements 10 of the rim 5. This causes deformation of the elastic ring 3. When the rotational speed is increased, the elastic ring 3 tends, under the action of centrifugal forces, to assume the shape of a regular circle. At the same time, under the action of restoring potential forces of the elastic ring 3 which is in the deformed state, the arms 7 stop their rotation, and a dynamic balance is established at certain values of the torque and rotational speed. The centrifugal force applied to the elastic ring 3 contributes to self-adjustment, increases a gyroscopic interconnection between the members of the coupling and gives rise to effective damping capacity of the coupling.

The advantages of the centrifugal elastic coupling of the invention as compared to that of the conventional type are as follows.

The coupling proposed herein enables rotational speed to be increased up to 50000 rpm at large torque transmitted (0–5000 Nm); it can operate with increased variable misalignment between interconnected shafts (i.e. with radial misalignment up to 4 mm, angular misalignment up to 4° and axial play up to 5 mm for the coupling of 150 mm outside diameter). For the same values of transmitted torques the coupling of the invention is 1.5–2 times lighter than the known couplings of this type with spring elements. The coupling is compact and simple in manufacture due to a small number of component parts. Besides, the coupling ensures quick connection and disconnection of shafts during assembly and disassembly. It can be used in devices operating under heavy impact loads, at high temperatures or in chemically-aggressive media.

The couxling features an increased damping capacity and a low inertia at the said time meeting strict demands on uniformity of rotation.

What is claimed is:

1. A centrifugal elastic coupling formed of two members having facing ends interconnectable with each other, the members having a limited degree of movement therebetween, the coupling comprising:
   a first of said two members having a hub-shaped facing end with a rim having an interior surface with two inwardly protruding portions, the rim defining an interior space within the first member;
   first supporting means operatively associated with said inwardly protruding portions of the interior surface of said rim;
   a second of said two members having a hub-shaped facing end with outwardly extending arms, said arms having ends positionable within portions of the interior space of said first member in such manner that said ends are radially spaced from said inwardly protruding portions so that a limited degree of movement is possible between said two members and that rotational movement of one of said two members in excess of said limited degree rotates the other of said two members;
   second supporting means operatively associated with said ends of said extending arms; and
   an elastic ring positioned within the interior space of said first member and surrounding said second member, the elastic ring being supported by said first and said second, supporting means.

2. A centrifugal elastic coupling according to claim 1 wherein said elastic ring during rotation of said elastic coupling exerts a force on said second member opposite the force exerted on said second member by the rotation of said elastic coupling.

3. A centrifugal elastic coupling according to claim 1, wherein the first supporting means are made in the form of bearings having outer surfaces facing the elastic ring.

4. A centrifugal elastic coupling to claim 3 wherein said bearings have end faces adapted to retain said elastic ring in said interior space within said first member.

5. A centrifugal elastic coupling according to claim 1, wherein said first and said second supporting means are formed with cylindrical surfaces with convex sides of the surfaces facing the elastic ring.

6. A centrifugal elastic coupling according to claim 1, wherein said first and said second supporting means are made in the form of bearings with outer surfaces facing the elastic ring.

7. A centrifugal elastic coupling according to claim 1, wherein the second supporting means are bearings having outer surfaces facing the elastic ring.

* * * * *